United States Patent [19]
Wagner et al.

[11] Patent Number: 5,157,408
[45] Date of Patent: Oct. 20, 1992

[54] LOW PROBABILITY OF INTERCEPTION RELATIVE POSITION DETERMINATION SYSTEM

[75] Inventors: Kenneth M. Wagner, Pomona; William Stahley, Fountain Valley; James R. Van Cleave, Glendora, all of Calif.

[73] Assignee: NavCom Defence Electronics, Inc., El Monte, Calif.

[21] Appl. No.: 528,807

[22] Filed: May 25, 1990

[51] Int. Cl.$^5$ .............................................. G01S 1/44
[52] U.S. Cl. .................................... 342/399; 375/1; 342/400; 342/49
[58] Field of Search ............... 342/399, 400, 401, 402, 342/403, 404, 405, 406, 49; 380/48, 33; 375/1

[56] References Cited

U.S. PATENT DOCUMENTS

| | | | |
|---|---|---|---|
| 3,714,573 | 1/1973 | Paradise | 342/404 |
| 3,940,763 | 2/1976 | Grossman | 342/404 |
| 3,969,725 | 7/1976 | Couvillon et al. | |
| 4,010,465 | 3/1977 | Dodington et al. | |
| 4,162,495 | 7/1979 | Prill | 342/402 X |
| 4,442,430 | 4/1984 | Schneider | 342/45 |
| 4,564,840 | 1/1986 | Brisse et al. | |
| 4,751,512 | 6/1988 | Longaker | |
| 4,910,521 | 3/1990 | Mellon | 342/45 |

OTHER PUBLICATIONS

Merrill I. Skolnik, Introduction to Radar Systems, Radar Transmitters, McGraw-Hill 1962, p. 223.
Merrill I. Skolnik, Radar Handbook, 1970, pp. 7-61.
Navcom Defense Electronics, Inc. Brochure, AN/UR-N-25 TACAN Transponder.
Robert C. Dixon, Spread Spectrum Systems and Interference Rejection Techniques, Engineering 867.36, 1983.
Military Standard Standard Tactical Air Navigation (TACAN) Signal, FSC 5826, Dec. 13, 1967, pp. ii, iii, 1-11.

*Primary Examiner*—Tod Swann
*Attorney, Agent, or Firm*—Cushman, Darby & Cushman

[57] ABSTRACT

A radio system for determining the range and bearing of mobile equipment, such as an aircraft, relative to reference equipment such as an aircraft carrier, with low probability of interception (LPI). The aircraft remains equipped with high power range and bearing determination equipment, such as TACAN equipment. Reference equipment transmits a LPI beacon, such as a pseudo noise code spread spectrum signal through a rotating beam antenna to amplitude modulate the beacon as a function of antenna orientation. The PN code is inverted as the antenna passes through a reference bearing. Mobile LPI equipment determines bearing and generates a high power signal, such as an emulated TACAN beacon signal. High power range and bearing equipment extracts bearing information from the emulated signal and display it. Range can be determined in a cooperative mode. Mobile LPI equipment transmits a LPI interrogation signal. Reference LPI equipment returns a LPI reply signal. Mobile LPI equipment determines range from the delay time, and generates a high power reply signal from which the high power range and bearing position determination means can extract and display range information.

37 Claims, 5 Drawing Sheets

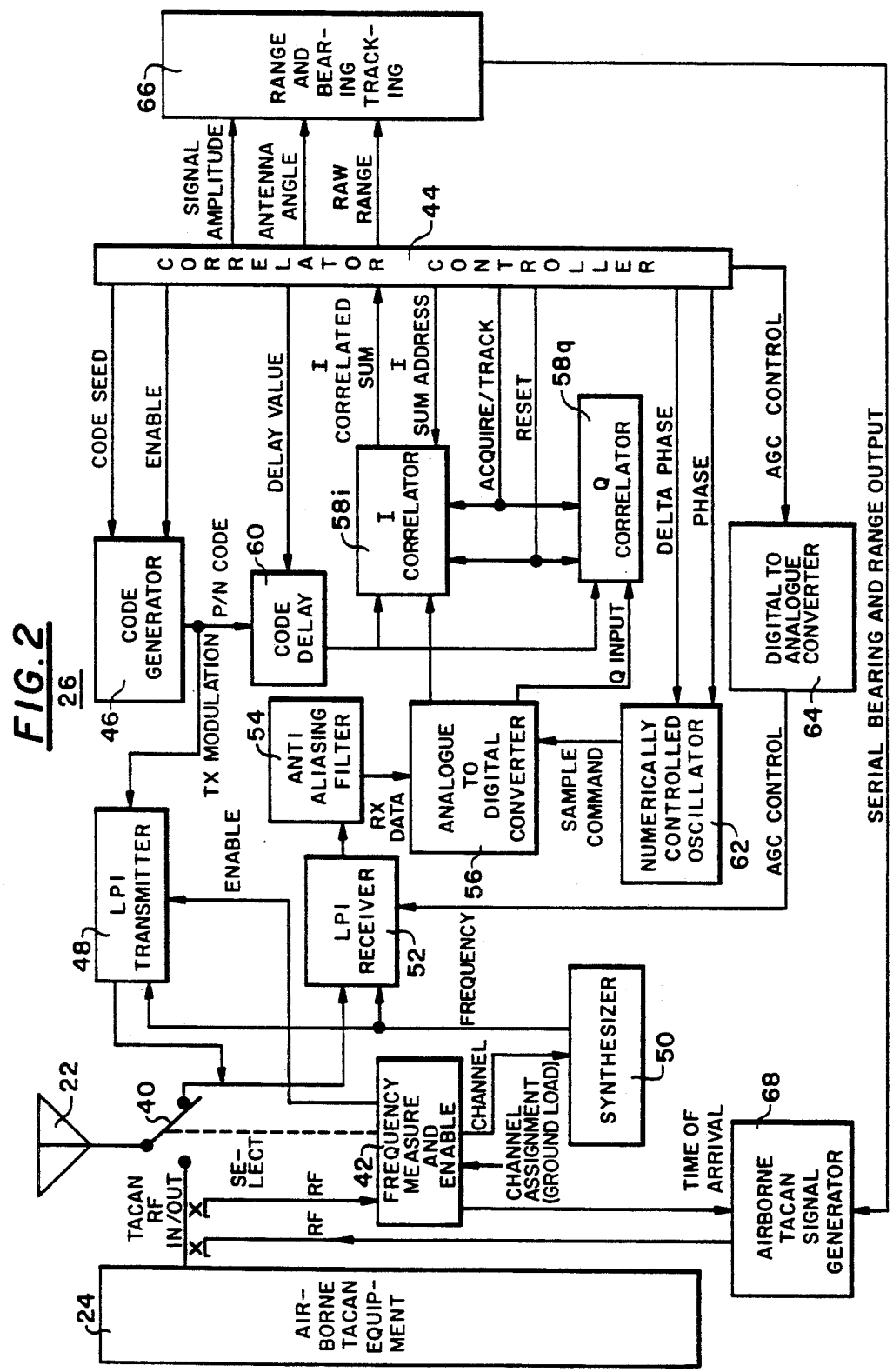

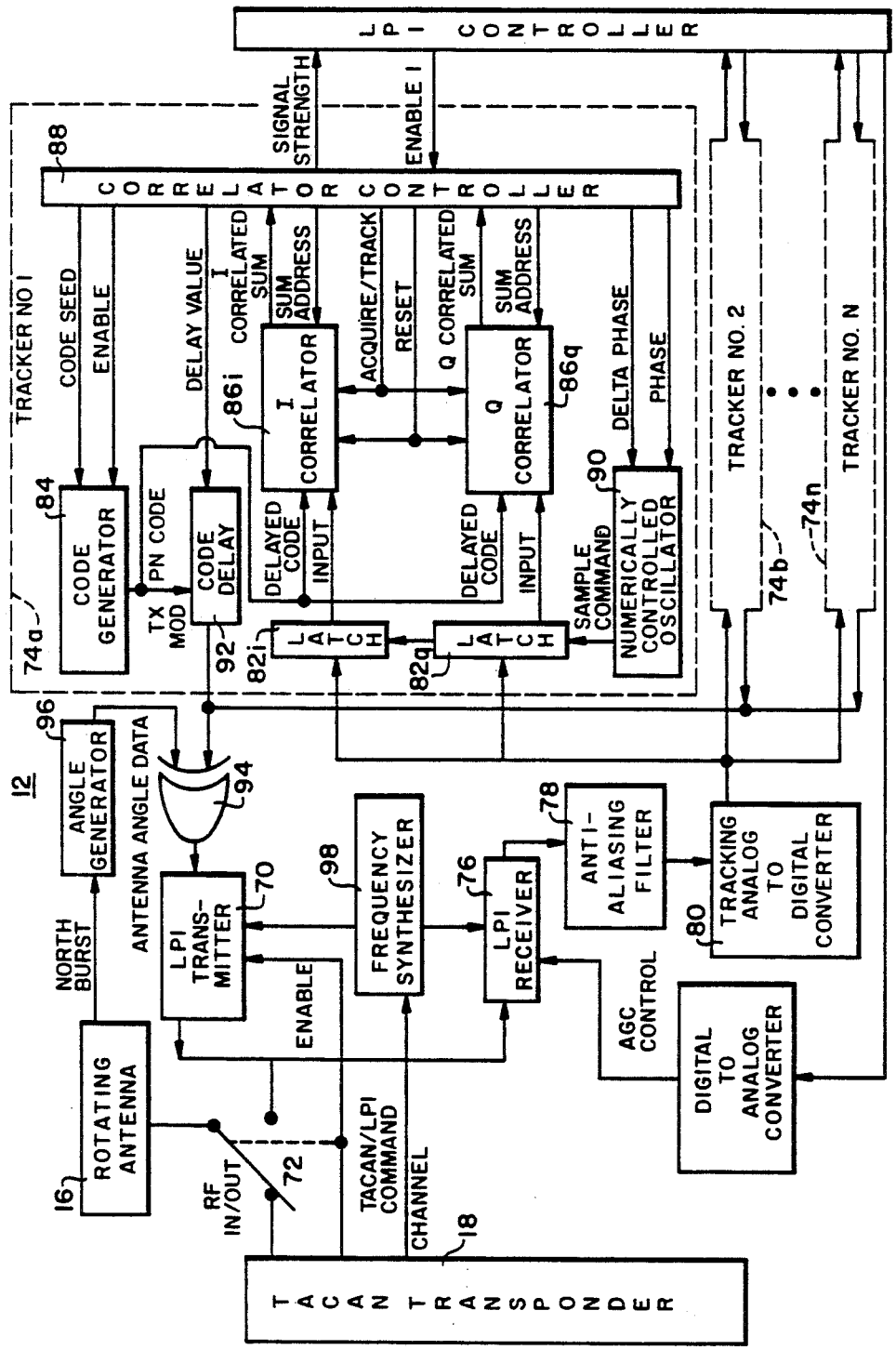

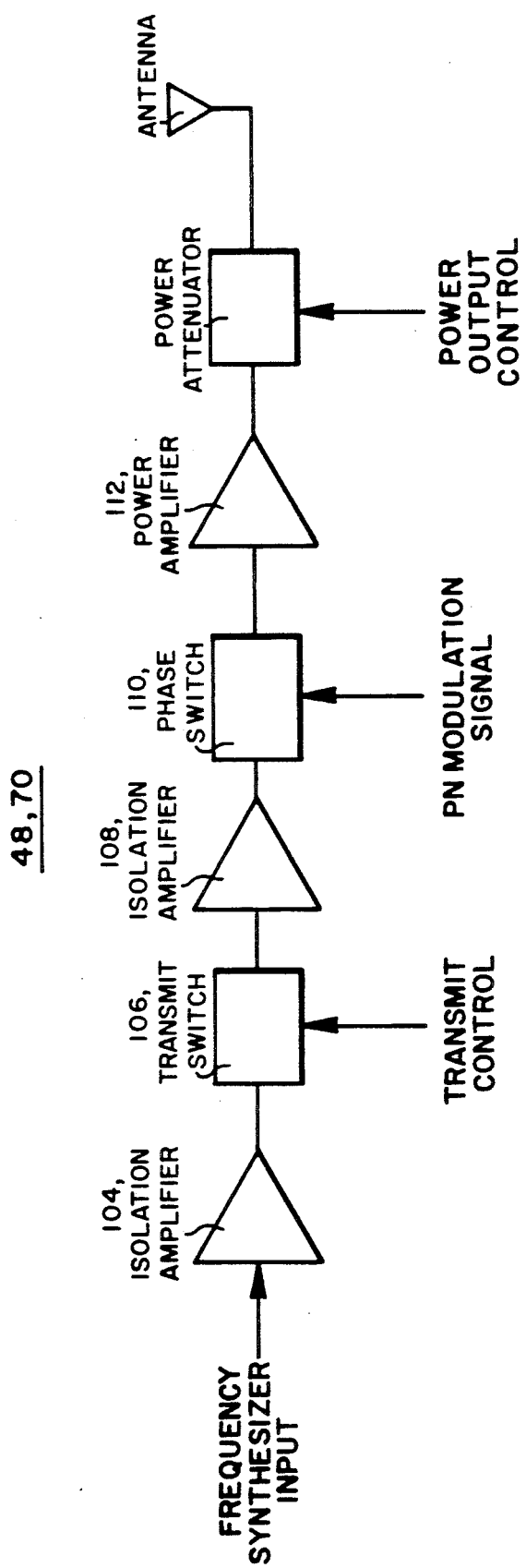

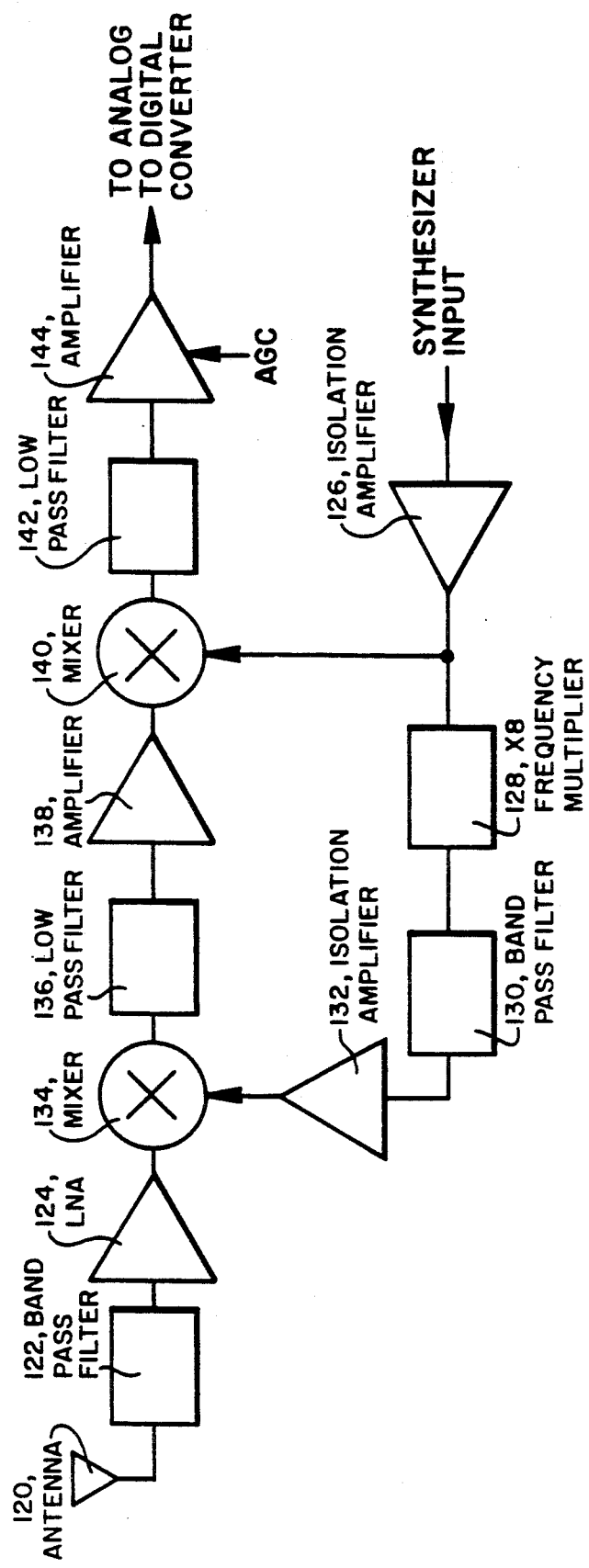

LOW PROBABILITY OF INTERCEPTION RELATIVE POSITION DETERMINATION SYSTEM

BACKGROUND OF THE INVENTION

The present invention relates to position determination and radio navigation. In particular, the present invention relates to methods and apparatus for determining the relative bearing and range between two mobile objects (e.g. aircraft and aircraft carrier) or between a mobile object (e.g. aircraft) and a stationary object (i.e. TACAN ground station) with a low probability of detection of radio signals by an unfriendly opponent.

Mobile objects, such as aircraft flying from an aircraft carrier sometimes require methods for determining range and bearing to a reference object which may be mobile or stationary, such as the ship. This is especially important when the reference object moves, such as when a carrier conducts evasive maneuvers after launching aircraft for an attack. In one system for determining range and bearing information, known as TACAN, a shipboard or ground installation, or another aircraft transmits high power pulse pair radio signals from which an aircraft can determine relative range and bearing. The ship or ground installation has a rotating antenna which amplitude modulates these pulse pairs as it sweeps through a 360 degree revolution. The power radiated along any particular direction varies with time, having a period equal to antenna RPM. To an aircraft, the signal envelope of the pulse pairs appears to be amplitude modulated with the peak occurring each time the antenna points directly at the aircraft. As the antenna beam sweeps through a North reference bearing, the ship transmits a series of closely spaced pulses which are referred to as a North burst signal. When an aircraft is due east of the carrier, the North burst will coincide with the envelope peak. When an aircraft is positioned along any other bearing, the north burst and the maximum amplitude signal will be separated in time, and the aircraft can determine bearing from measuring elapsed time between the North burst and the maximum signal amplitude. By thus detecting this elapsed time, an aircraft can passively determine bearing to the beacon (e.g. ship, ground installation, or other aircraft).

Aircraft must operate in an active mode to determine range. An aircraft can transmit an interrogation pulse pair. When the ship receives the aircraft's interrogation pulses, the ship delays a fixed time interval and replies by transmitting a pulse pair. The aircraft must correlate several interrogations to determine the reply pulse from all other pulse pairs transmitted by the beacon. The aircraft then computes the round trip radio propagation time delay by measuring the total delay between the aircraft's transmission pulses and the reception of the ship's reply, and then subtracting out the fixed delay. The range to the beacon is simply the one way propagation delay time multiplied by the radio signal propagation velocity.

Systems which, like TACAN, use a high power radio signal create risk to the beacon installation itself (e.g. aircraft carrier). Hostile forces can use the RF signal for locating the beacon and launching an attack. Moreover, weapons may use the beacon for targeting, via radio seeking missiles. Ships turn off their beacons when they suspect an enemy may be nearby. The aircraft are unable to obtain range and bearing during the off time; therefore, the TACAN is useless. An alternate relative navigation system is needed, especially with the proliferation of intelligent missiles which can home in on radio transmitters.

There are non-threat related instances where low probability of intercept (LPI) relative navigation is desirable. For example, LPI signals sometimes cause less interference with other radio transmissions (fratricide).

It is sometimes also desirable, to retain the normal, high power capability for cases where no enemy operations are present. This can allow compatibility with multiple systems. Commonality of certain functions, such as operator interface, simplifies operation and reduces cost and training impact.

A simple-to-operate, low-cost method for providing existing aircraft with a relative navigation system having a low probability of intercept (LPI) is thus highly desirable. Because of the high cost of retrofitting many aircraft and the interruption of operations which accompany such replacement, an add-on unit (modification to existing equipment) is especially desirable from a cost, schedule, and risk point of view. Retaining compatibility with existing equipment constrains possible solutions.

SUMMARY OF THE INVENTION

The relative radio navigation system of the present invention provides add-on LPI position and range determination. It determines range and bearing to/from a mobile apparatus, such as an aircraft, to a reference apparatus, such as an aircraft carrier with spread spectrum techniques having a low probability of interception (LPI). The preferred embodiment retains the airborne elements of the TACAN range and bearing determination system by inserting an add-on LPI unit on both the airborne TACAN equipment and the mobile or fixed TACAN beacon.

Reference apparatus (such as on an aircraft carrier) generates a LPI beacon signal, such as a PN coded spread spectrum signal, through a rotating beam antenna and modulates the beacon signal with beam orientation information. The airborne-side add-on LPI unit receives the LPI beacon signal, and generates a signal emulating a shipboard TACAN transponder beacon signal. The airborne TACAN equipment receives the emulated beacon signal from the airborne LPI unit on the aircraft, computes range and bearing, and drives displays for the pilot.

When a pilot selects a channel designated as an LPI channel, the airborne TACAN unit generates a high power interrogation signal. The airborne add-on LPI unit measures the frequency and determines that it is designated an LPI channel. The add-on LPI unit isolates the TACAN unit from the antenna and transmits a LPI interrogation signal. Reference apparatus on the beacon (e.g. carrier) responds with its own LPI reply signal from which the airborne LPI unit can determine position. The airborne LPI unit determines position by processing the LPI beacon signal and generates a signal emulating a shipboard TACAN reply. The airborne TACAN equipment receives the emulated reply and displays position to the pilot.

The interrogation signal can be a PN coded spread spectrum signal, and the reply can be the same PN code sequence synchronized to the interrogation signal. The airborne LPI unit can determine range from the phase delay between the interrogation and reply sequences and bearing from coded bearing data imbedded in the LPI beacon signal. The LPI reply signal and the LPI beacon signal can be the same PN code sequence.

BRIEF DESCRIPTION OF THE DRAWINGS

The preferred embodiment of the invention will be described with reference to accompanying figures of which:

FIG. 2 is a block diagram showing additional detail of airborne LPI equipment depicted in FIG. 1;

FIG. 3 is a block diagram showing additional detail of reference LPI equipment depicted in FIG. 1;

FIG. 4 is a block diagram a transmitter suitable for use as a LPI transmitter depicted in FIGS. 2 or 3.

FIG. 5 is a block diagram a receiver suitable for use as a LPI receiver depicted in FIGS. 2 or 3.

DESCRIPTION OF THE PREFERRED EMBODIMENT

Figure 1:
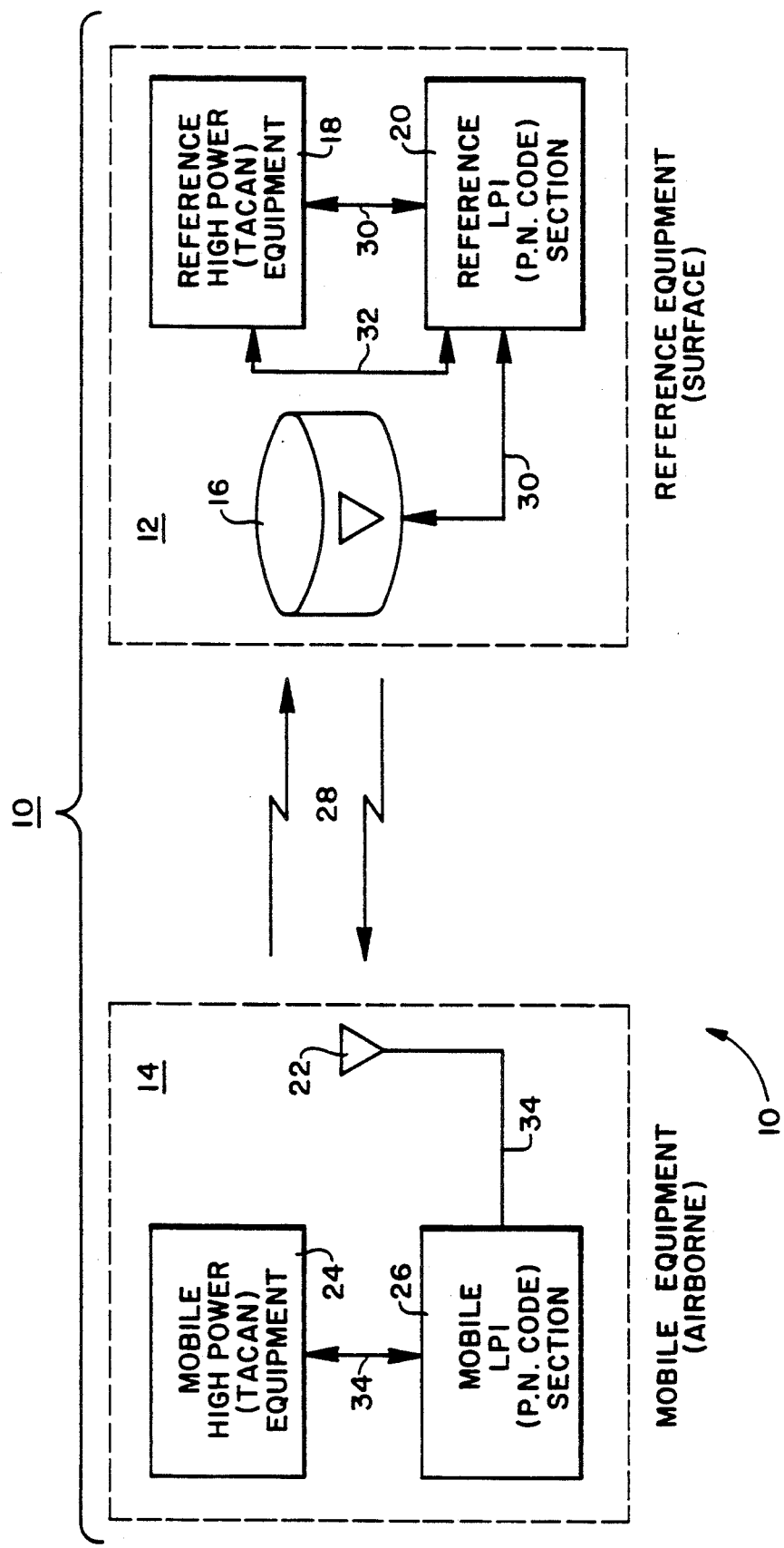
FIG. 1 is a symbolic representation of the major functional units of a system including the present invention.

The broad system structure and general operation will be discussed with reference to FIG. 1. The system 10 includes reference equipment 12 (referred to in the preferred embodiment as surface equipment) and mobile equipment 14 (referred to in the preferred embodiment as airborne equipment). Surface equipment 12 serves as a reference to which position is measured, such as an aircraft carrier or other fixed or mobile platform. The system may include many sets of airborne equipment, such as multiple aircraft flying from the platform. Description will be made of a single exemplary set of airborne equipment, except where explanation of the operation of multiple sets is necessary.

Surface equipment 12 includes a rotating beam antenna 16, a TACAN transponder 18 and a low probability of intercept (LPI) section 20. The rotating beam antenna 16 connects to the surface LPI section 20 and high power position determination equipment 18 (a TACAN transponder in the preferred embodiment) through a radio frequency channel 30. The antenna also supplies a north burst trigger signal 32 indicating the time when the antenna rotates through a reference bearing which, in the preferred embodiment is magnetic 090°. The TACAN transponder 18 also sends enable and channel frequency control signals to the surface LPI section 20.

Airborne equipment 14 includes an airborne antenna 22, connected to airborne TACAN equipment 24 and to an airborne LPI section 26 through a radio frequency channel 34.

Radio signals 28 form a communications channel linking the surface equipment 12 and airborne equipment 14. Aircraft transmit in one frequency portion of a channel and surface equipment transmits in a separate frequency portion of a channel. There may be many separate frequency channels, and the preferred embodiment uses 126.

Each frequency channel in the system can programmed to operate in either a LPI mode or a high power (i.e. normal) mode. In the high power mode (normal), the TACAN transponder 18 communicates directly through the rotating beam antenna 16, and the airborne TACAN equipment 14 communicates directly through the airborne antenna 22. The airborne TACAN equipment 14 transmits interrogation pulses, receives transponder replies, computes range and bearing, and displays the results to the pilot.

In the LPI mode, the airborne LPI section 26 isolates the TACAN airborne equipment 14 from the airborne antenna 22. Instead, the airborne LPI section 26 transmits a low probability of interception (LPI) signal. LPI signals include those generated by spread spectrum communications techniques. The surface LPI section 20 replies through the rotating beam antenna 16 with a synchronized spread spectrum signal that is modulated with beam direction information. When the airborne LPI section 26 receives the return spread spectrum signal, it determines range and bearing, and generates a TACAN format signal which emulates the return signal that the TACAN transponder would have generated. The airborne TACAN equipment 16 receives the emulated TACAN signal, computes range and bearing, and displays these results to the pilot.

In the preferred embodiment, the LPI mode uses pseudo noise (PN) codes to "spread" information needed to determine range and bearing across a larger frequency band than would be used by a high power TACAN beacon. A PN code is a binary sequence, and each transition (i.e., 1 or 0) in the sequence is referred to as a chip. PN codes typically repeat only after long intervals and are said to have a phase relative to the beginning of the sequence. Two signals, each having identical PN codes in phase with each other have a high cross correlation. However, two signals having identical PN codes which are out of phase (even slightly) have a low cross correlation. Transmitting such a code at a particular chip rate has the effect of modulating the carrier at the chip rate, which may correspond to a wide frequency bandwidth. As a compensating feature, the transmission power can be reduced to a level where the signal to noise ratio is less than one. That is to say, the signal strength is at or below the background noise level. This low power operation makes undesired detection of the signals difficult when compared to existing high power operation. General principals of PN coded spread spectrum communications are discussed in J.G. Proakis, *Digital Communications,* ch. 8, McGraw Hill, New York, 1983, including methods for generating PN codes.

In order to receive such a spread spectrum signal, a receiver may detect the PN code over a time interval by comparing an incoming signal to an anticipated PN code and matching the phase of the incoming code to a locally generated PN sequence. To accomplish this, LPI mode of the preferred embodiment has two phases: an acquisition and tracking. During the acquisition phase, the airborne LPI section 26 transmits a short pseudo noise (PN) sequence at a moderate power level for a short period of time. This acquisition phase, though moderate in power, offers extremely good LPI quality due to its short duration. When the surface LPI section 20 detects the acquisition sequence, it responds by retransmitting the same sequence. The retransmitted sequence is precisely synchronized in chip rate and phase with the received sequence. When the airborne LPI section 26 detects the return acquisition sequence, acquisition is complete, and the system enters the tracking phase. During the tracking phase, the airborne LPI section 26 changes its transmission to a longer PN sequence and reduces power. The surface LPI section similarly changes its sequence and power.

The surface LPI section 20 modulates the PN sequence by inverting it twice during each antenna rotation, for example, as the antenna passes through magnetic north and south. The rotation of the antenna serves to modulate the power envelope. The airborne LPI section 26 detects both the time of peak signal strength and the times of PN code inversion and derives bearing signal based on the time difference between these two events.

The airborne LPI section 26 determines range by measuring the phase delay between the phase of the PN code it transmits and the phase of the PN code returned from the surface LPI section 20. The delay, in chips of the sequence, is proportional to the round trip radio signal propagation delay plus the preprogrammed delay in the surface (i.e. beacon) equipment 12. The round trip radio propagation delay can be computed by dividing the phase delay (in chips) by the chip rate (in chips per second) and subtracting out the surface equipment delay. Range can the be computed by multiplying the one way radio propagation delay by the velocity of the radio signal.

For an antenna beam rotating at 15 revolutions per second, transmitting in the vicinity of 1,000 MHz over a desired range of approximately 400 miles, the PN code (which inverts twice per antenna period) may have a chip rate on the order of 30 MHz and the reduced power level may be less than one watt without system performance degradation. The short (acquisition) PN code may repeat after 1000 chips and the long (tracking) PN code may repeat after a period of 60 days or more.

Detailed description of the airborne LPI section 26 and surface (i.e. beacon) LPI section 20 will be made with reference to functional block diagrams. Both LPI units can be added to existing TACAN equipment of any manufacturer without affecting normal (i.e. high power) operation. Detailed design based on these functional block diagrams and the description included here is within the capabilities of those of ordinary skill in the art.

Detailed description of the airborne equipment 14 will be made with reference to FIG. 2. Items in FIGS. 1 and 2 having identical reference numbers refer to identical items. Airborne equipment 14 includes an airborne antenna 22 connected to airborne TACAN equipment 24 and to an airborne LPI section 26 through a radio frequency channel 34. A switch 40 connects the airborne antenna 22 to either the airborne TACAN equipment 24 or the airborne LPI section 26.

The airborne LPI section 26 may be configured to operate at any of 126 frequency channels. When an operator manipulates a selector on the control panel (not shown) of the airborne TACAN equipment 24, the airborne TACAN equipment 24 generates a high power interrogation signal to the radio frequency channel 34 at the selected frequency. A frequency measure and enable circuit 42 maintains a channel assignment indicating which channels are designated LPI channels and the high power interrogation signal. When the airborne TACAN equipment 24 generates an interrogation signal in an LPI configured channel, the frequency measure and enable circuit 42 activates the switch 40 to isolate the airborne TACAN equipment 24 from the airborne antenna 22 and connect the airborne LPI section 26 instead. The frequency measure and enable circuit 42 also sets a synthesizer 50 in the airborne LPI section 26 to the same frequency as the high power interrogation signal.

When the LPI section 26 is so connected, it transmits a LPI interrogation signal. More specifically, a correlation controller 44 instructs the code generator 46 to generate a short acquisition PN sequence. The correlation controller may be a 16 bit digital signal processor (DSP) capable of rapidly performing binary multiplication operations. Implementation of a specific architecture depends upon the particular DSP selected, but selection and implementation are within the ordinary skill of those in the art from the functional descriptions included here.

An LPI transmitter 48 transmits the short sequence at moderate power at a frequency determined by a synthesizer 50, i.e., at the same frequency as the high power interrogation signal. Details of the LPI transmitter 48 will be discussed below. Surface equipment (not show) returns the short sequence (as described below), and an LPI receiver 52 downconverts the return transmission to baseband. The LPI receiver 52 will be discussed in more below.

The baseband signal passes through an anti-aliasing filter 54, and an analog to digital (A/D) converter 56 converts it to a digital value. A code delay 60 delays the PN code from the code generator 46, and the delayed sequence is also clocked into the correlators $58i, 58q$. The correlators $58i, 58q$ compare the two sequences and generate a sum indicating the number of matches, as, for example, performed by part number L10C23 from Logic Devices, Inc.

PN codes are chosen so that the correlation value is high when two identical sequences are in phase, and so that the correlation value is low when the two sequences are out of phase, even slightly. The returned digital signal is clocked into both I and Q correlators $58i, 58q$. The correlator controller 44 adjusts the delay of the PN code in a closed loop fashion until the delayed PN code from the generator 46 precisely phase matches the received sequence from the A/D converter 56. The correlation controller 44 also adjusts a numerically controlled oscillator 62 to synchronize the sample rate of the A/D converter 56 to the received carrier frequency. When properly synchronized, the I (in phase) correlator receives samples from the peaks of the carrier, and the Q (quadrature phase) correlator receives samples of the carrier at zero crossings. When the code generator PN code sequence and the A/D converter samples track the received PN sequence, acquisition is complete.

Once the airborne equipment 26 has synchronized its code delay 60 so that the received PN sequence from the surface LPI equipment (not shown) correlates with the locally generated code, the correlator controller instructs the code generator 46 to switch to the long PN code, and the LPI transmitter 48 to reduce power. The surface equipment (not shown) returns the long sequence, and inverts the PN code twice per antenna revolution (as described below). The correlator controller 44 continues to adjust the code delay 60 and the numerically controlled oscillator 62 to maintain synchronization. The system is then in the tracking phase.

The correlator controller 44 computes range to the surface equipment (not shown) from the delay value of the code delay 60. The delay value is proportional to the round trip propagation delay between the airborne LPI section 26 and the surface equipment (not shown) and to processing delay in the surface equipment.

The correlator controller provides signal amplitude, antenna angle, and raw range information to a range and bearing tracking circuit 66, which passes serial bearing and range information to an airborne TACAN signal generator 68. In addition, frequency measure and enable circuitry 42 monitors the time of transmission of the ranging pulse from the airborne TACAN equipment 24 and provides a timing signal to the TACAN signal generator 68. The airborne TACAN signal generator 68 produces a TACAN signal identical to one which would have been produced by the surface equipment (not shown) at the range and bearing determined by the range and bearing tracking circuitry 66 as if the system as a whole were operating in TACAN mode. The airborne TACAN equipment 24 thus receives the same signal format, regardless of the operating mode of the overall system. The airborne TACAN equipment 24 displays range and bearing information to the pilot on the aircraft instrument panel (not shown).

Detailed description of the surface equipment 12 will be made with reference to FIG. 3. Items in FIGS. 1 and 3 having identical reference numerals refer to identical items. Surface equipment 12 includes a rotating beam antenna 16, a Reference high power TACAN transponder 18 and a low probability of intercept (LPI) section 20. A command from the TACAN transponder 18 enables the LPI transmitter 70 and causes a switch 72 to connect the rotating antenna to the LPI section 20. The LPI transmitter 70 operates essentially identically to the LPI transmitter in the airborne LPI section (FIG. 2) and is discussed in more detail below. For each aircraft, the surface LPI section 20 includes trackers 74a–74n. One of the trackers 74a will be described here, and the operation of all trackers is similar.

When airborne equipment (not shown) transmits a short PN acquisition sequence, an LPI receiver 76 amplifies the phase shift keyed signal. The LPI receiver 76 in the surface equipment 12 operates identically to the LPI receiver in the airborne equipment (FIG. 2) and will be discussed in more detail below. The resulting signal passes through an anti-aliasing filter 78 and then a tracking analog to digital converter 80. The resulting digital signal passes to the tracker 74a where it is sampled and stored in I and Q latches 82i, 82q and then clocked into I and Q correlators 86i,86q. At the same time, a PN code generator 84 produces the short PN code (identical to the one transmitted by the airborne equipment) which is also clocked into the correlators 64i,64q. A correlator controller 88 adjusts the PN code generator 84 in a closed loop fashion until the PN code from the generator 44 precisely phase matches the received sequence. The code generator is controlled by providing a code seed from which the PN sequence is derived and by enabling and disabling the generator.

The correlation controller 88 also synchronizes a numerically controlled oscillator 90 so that the latching of samples of the received signal is synchronous with the transmitted carrier from the airborne LPI section 26 (not shown) being tracked. When properly synchronized, the I (in phase) correlator receives samples from the peaks of the carrier, and the Q (quadrature phase) correlator receives samples of the carrier at zero crossings.

Once the correlator controller 88 has synchronized the code generator 84 to received sequence, the PN sequence is delayed by a fixed value in the code delay circuit 92. The delayed code passes from the tracker 74a to an exclusive OR gate 94. At the same time, the rotating antenna 16 sends the north burst signal 32 to an angle generator 96 that produces a digital signal which inverts (i.e., switches from zero to one or one to zero) twice per rotation of the antenna beam. The exclusive OR gate 96 thus modulates the delayed and synchronized PN code with beam rotation. The LPI transmitter 70 transmits the modulated PN code through the rotating beam antenna 16 at an initial power level at a frequency determined by a frequency synthesizer 98. A channel command from the TACAN transponder 18 sets the frequency synthesizer 98 to one of the 126 possible channel frequencies of the system.

When airborne equipment (not shown) synchronizes to the surface equipment's short code (as described above), acquisition phase is complete. The airborne equipment reduces power and transmits a long PN sequence (as also described above). The surface equipment 12 receives the long PN sequence, the correlator controller 88 provides a new seed to the code generator 84 which then generates the same long PN sequence as the airborne LPI section 26. The correlation controller 88 continues to adjust code generator 84 and the numerically controlled oscillator 90 to synchronize them to the received signal. The LPI controller 100 commands the LPI transmitter 70 to low power, and the system is then in the tracking phase.

When the tracker 74 is synchronized to the airborne LPI section (not shown), the value of the correlation sum will vary with amplitude of the received signal. The correlator controller 88 monitors the correlation sum and provides a measure of signal strength to the LPI controller 100. The LPI controller 100 in turn provides an automatic gain control signal, which is a composite of all signals received from all trackers, to the LPI receiver 76 so that strength of the return PN signal remains within the sensitivity range of the A/D converter 80 as aircraft move relative to the surface equipment 12.

The airborne LPI section and the surface LPI section contain circuitry designated as LPI transmitters (FIG. 2, item 48 and FIG. 3, item 70). Operation of both transmitters is essentially identical and will be described with reference to FIG. 4.

The transmitters 48,70 bi-phase shift key a carrier signal according to the PN code in a well known manner. A synthesizer (not shown) generates the carrier signal at a desired frequency. A first isolation amplifier 104 boosts the carrier signal, and a switch allows on/off control in response to an enable signal. A second isolation amplifier 108 provides additional gain, and a phase switch 110 performs phase shift keying by selectively switching one of two phases of the carrier to the next stage. A power amplifier 112 provides additional gain to a level desired for transmission of an acquisition signal, and a power attenuator 114 allows for reduction of output power to a lower level for transmission of long PN sequences with low probability of interception.

The airborne LPI section and the surface LPI section contain circuitry designated as LPI receivers (FIG. 2 item 52 and FIG. 3 item 76) which perform downconversion functions. Operation of both receivers is essentially identical and will be described with reference to FIG. 5.

An antenna 120 receives radio transmissions, and a first bandpass filter 122 blocks power in frequencies outside the desired band. A low noise amplifier 124, having a gain on the order of 15 dB, boosts the received and filtered signal to a level for further processing.

A synthesizer (not shown) generates a signal near the desired output frequency, which would be below the frequency response of other circuitry in the LPI section. This nominal frequency may be on the order of 100 MHz below the received signal at the antenna. A first isolation amplifier 126 boosts the synthesized signal, and a frequency multiplier 128 generates a frequency multiplied signal. If the received signal has a center frequency on the order of 1,000 MHz, the multiplier may be approximately 800 MHz. A second bandpass filter 130 blocks undesired energy at frequencies outside the desired band following multiplication. A second isolation amplifier 132 boosts the signal and isolates the synthesizer from the signal out of the low noise amplifier 124.

A first mixer 134 downconverts the received, filtered and amplified signal by mixing it with the filtered signal from the local oscillator. The output of the first mixer 134 contains signals have frequencies at the sum and difference of the input signals. For a received signal of 1,000 MHz and a multiplied frequency of 800 MHz (eight times the 100 MHz nominal frequency), the output of the first mixer output would include signals around 1800 MHz and 200 MHz. A third low pass filter 136 blocks the summation frequency signal and allows the 200 MHz signal to pass. A third amplifier 138 boosts the downconverted signal, and may have a gain on the order of 30 dB. A second mixer 140 combines the downconverted signal with the nominal frequency signal to achieve a second downconversion step. For example, combining the 100 MHz nominal signal with the 200 MHz output from the first mixer 134 results in sum and difference signals around 100 MHz and 300 MHz respectively. A fourth low pass filter 142 removes the higher frequency signal, leaving a signal downconverted to around 100 MHz. A fourth amplifier 144 provides an output with variable gain which can be controlled by an automatic gain control (not shown). The output at this point is an analog signal containing both phase and amplitude modulation information.

System operation with multiple aircraft (each having airborne equipment) is similar to operation with a single aircraft. Each airborne LPI section initiates acquisition independently by transmitting short PN sequences. All operate on the same frequency channel, but with different codes. Proper selection of codes, such as a well known Gold code, allows all to operate without interference. The correlation of one such code from one transmission to another is low when the codes are out of phase, and the transmissions from one airborne LPI section operates merely as background noise to each other transmission.

The rotating beam antenna 16 receives the combined transmission, and all trackers 74a-74n received the composite of all transmissions. Each aircraft transmits with a different code phase, and each tracker 58a-58i is selected to lock to one of the aircraft transmissions. When many trackers are locked to different aircraft, the gain can be adjusted to maintain the level of the composite signal within the sensitivity range of the A/D converter.

Each tracker 74a-74n replies to an aircraft by retransmitting a PN code sequences in phase with the signal received from one aircraft. All (delayed and synchronized) replies mix at the input to the exclusive OR gate 94. PN codes from the trackers are added (according to an AND function) and the composite is input to the exclusive OR gate 94. Just as each tracker can lock to one PN code in a mixed signal, so can each airborne LPI section isolate the reply from one tracker.

ALTERNATE EMBODIMENTS

The preferred embodiment was described to include an add-on unit to an aircraft working in cooperation with an existing TACAN unit, and which included both TACAN and LPI shipboard equipment. Alternative embodiments can be produced.

In a first alternate embodiment, aircraft are equipped with only LPI position determination equipment, while the ship is equipped with only LPI reference equipment.

In a second alternate embodiment, aircraft are equipped with only LPI position determination equipment while and the ship is equipped with both TACAN and LPI equipment. Such a ship could operate with LPI-only aircraft, while retaining compatibility with TACAN-only aircraft.

In a third alternate embodiment, aircraft are equipped with both TACAN and LPI equipment while the ship is equipped with only LPI equipment. Such aircraft could operate with an LPI-only ship, while retaining compatibility with TACAN-only ships.

For each of the embodiments previously described (the preferred and the three alternate embodiments), additional variations are possible. Bearing-only and Range only variants can be made.

It should also be noted that the preferred embodiment has been described with respect to mobile aircraft and a reference aircraft carrier, but the invention may be applied to other types of mobile units. The preferred embodiment has been described as using PN coded spread spectrum techniques, but other spread spectrum techniques may also be applied including frequency hoping and frequency sweeping (chirping) techniques. Others not listed are included within the scope of the invention and will be recognized as such by those skilled in the art.

What is claimed is:

1. A radio navigation system for determining the position of a mobile apparatus relative to a reference comprising:
    position reference means for receiving an interrogation signal having low probability of interception (LPI TACAN) signal characteristic, for receiving standard TACAN interrogation signals, and for selectively transmitting either an LPI TACAN beacon signal or a standard TACAN beacon signal; and
    mobile relative position determination means for selectively transmitting either an LPI TACAN interrogation signal or a standard TACAN interrogation signal, for selectively receiving either an LPI TACAN or a standard TACAN beacon signal, and for determining position relative to the position reference means from the selectively received LPI TACAN or standard TACAN beacon signal.

2. A radio navigation system for determining the position of a mobile apparatus relative to a reference comprising:
    position reference means for receiving an interrogation signal having low probability of interception (LPI TACAN) signal characteristic, for receiving a standard TACAN interrogation signal and for selectively transmitting either a standard TACAN beacon signal or an LPI TACAN beacon signal; and
    mobile relative position determination means for transmitting an LPI interrogation signal, for receiving an LPI TACAN beacon signal and for determining position relative to the reference means from the LPI TACAN beacon signal.

3. A radio navigation system for determining the position of a mobile apparatus relative a reference comprising:
position reference means for receiving an interrogation signal having low probability of interception (LPI TACAN) signal characteristic and for transmitting an LPI TACAN beacon signal; and
mobile relative position determination means for selectively transmitting either an LPI TACAN interrogation signal or a standard TACAN interrogation signal, for selectively receiving an LPI TACAN beacon signal or a standard TACAN beacon signal, and for determining position relative to the reference means from the selectively received LPI TACAN or standard TACAN beacon signal.

4. A radio navigation system for determining relative bearing of a mobile apparatus relative to a reference comprising:
relative bearing reference means for selectively transmitting either a beacon signal having low probability of interception signal characteristics or a standard TACAN beacon;
mobile relative bearing determination means for receiving the LPI TACAN beacon and for determining relative bearing to the reference means from the LPI TACAN beacon.

5. A radio navigation system from determining bearing of a mobile apparatus relative to a reference comprising:
bearing reference means for transmitting a beacon signal having low probability of interception (LPI TACAN) signal characteristics; and
mobile relative bearing determination means for selectively receiving either the LPI TACAN beacon signal or a standard TACAN beacon signal and for determining relative bearing to the reference means from the selectively received LPI TACAN or standard TACAN beacon signal.

6. A radio navigation system for determining bearing parameters of a mobile apparatus relative to a reference comprising:
relative bearing reference means for selectively transmitting either a beacon signal having low probability of interception signal characteristics (LPI TACAN) or a standard TACAN beacon; and
mobile relative bearing determination means for selectively receiving either an LPI TACAN beacon or a standard TACAN beacon signal and for determining relative bearing to the bearing reference means from the selectively received LPI TACAN or TACAN beacon signal.

7. A radio navigation system comprising:
range reference means for receiving an interrogation signal having low probability of interception (LPI TACAN) signal characteristics, for receiving standard TACAN interrogation signals, and for selectively transmitting either an LPI TACAN reply signal or a standard TACAN reply signal; and
mobile relative range determination means for transmitting an LPI TACAN interrogation signal, for receiving the LPI TACAN reply signal, and for determining range to the reference means from the LPI TACAN reply signal.

8. A radio navigation system comprising:
range reference means for receiving an interrogation signal having low probability of interception (LPI TACAN) characteristics and for transmitting an LPI TACAN reply signal; and
mobile relative range determination means for selectively transmitting either an LPI TACAN interrogation signal or a standard TACAN interrogation signal, for receiving either an LPI TACAN reply signal or a standard TACAN reply signal, and for determining relative range to the reference means from the received LPI TACAN or standard TACAN reply signal.

9. A radio navigation system comprising:
range reference means for receiving an interrogation signal having low probability of interception (LPI TACAN) signal characteristics, for receiving standard TACAN interrogation signals, and for selectively transmitting either an LPI TACAN reply signal or a standard TACAN reply signal; and
mobile relative range determination means for selectively transmitting either an LPI TACAN interrogation signal or a standard TACAN interrogation signal, for selectively receiving either the LPI TACAN or standard TACAN reply signal, and for determining relative range to the reference means from the selectively received LPI TACAN or standard TACAN reply signal.

10. A system as in any of claims 1, 2, 3, 4, 4, 5, 6, 7, 8 or 9, wherein the reference means moves relative to the earth's surface.

11. A system as in any of claims 1, 2 or 3 wherein an LPI TACAN signal is a spread spectrum signal.

12. A system as in claim 11 wherein an LPI signal is a pseudo noise coded spread spectrum signal.

13. A system as in claim 12 wherein:
the reference means further includes antenna means for transmitting a beacon with a rotating beam and means for inverting the PN code sequence periodically and synchronously with the antenna rotations; and
the mobile relative position reference means includes means for determining bearing from the amplitude of the beacon and from the inversion times of the PN code sequence of the beacon.

14. A system as in claim 13 wherein:
the reference means includes means for transmitting an LPI TACAN signal having a PN code sequence related in time with a PN code sequence of an LPI TACAN interrogation signal; and
the mobile relative position reference means includes means for determining the time delay between a transmitted TACAN LPI interrogation signal code sequence and the received LPI TACAN reply PN code sequence.

15. A system as in any of claims 4, 5 or 6 wherein an LPI signal is a spread spectrum signal.

16. A system as in claim 15 wherein an LPI signal is a pseudo noise coded spread spectrum signal.

17. A system as in claim 16 wherein:
the reference means further includes antenna means for transmitting an LPI TACAN beacon with a rotating beam and means for inverting the PN code sequence of the beacon periodically and synchronously with the antenna rotations; and
the mobile relative position reference means includes means for determining bearing from the amplitude of the beacon and from the inversion times of the PN code sequence of the beacon.

18. A system as in any of claims 7, 8 or 9 wherein an LPI signal is a spread spectrum signal.

19. A system as in claim 18 wherein an LPI signal is a pseudo noise coded spread spectrum signal.

20. A system as in claim 19 wherein:
the reference means includes means for transmitting a PN code related in time with a PN code of an LPI interrogation signal; and
the mobile relative range determination means includes means for determining the time delay between a transmitted interrogation signal code sequence and the received reply PN code sequence.

21. A method for determining relative bearing from a vehicle to a navigation reference site comprising steps of:
transmitting a spread spectrum interrogation signal from the vehicle to the navigation reference site,
transmitting a spread spectrum reply signal from the landing site to the vehicle such that the reply signal has a duty cycle at least an order of magnitude greater than that of a conventional TACAN beacon signal and the amplitude of the reply signal received at the vehicle varies as a function of the relative bearing between the vehicle and the navigation reference site; and
determining bearing from the vehicle to the navigation reference site from the amplitude of the spread spectrum reply signal.

22. A method for determining relative range from a vehicle to a navigation reference site comprising steps of:
transmitting a spread spectrum interrogation signal from the vehicle to the navigation reference site,
transmitting a spread spectrum reply signal from the navigation reference site to the vehicle, said spread spectrum reply signal having a duty cycle at least an order of magnitude greater than that of a conventional TACAN beacon signal; and
determining range from the vehicle to the navigation reference site from the time delay between transmitting the spread spectrum interrogation signal from and receiving the spread spectrum reply signal at the vehicle.

23. A method as in claim 21 or 22 wherein the step of transmitting a spread spectrum reply signal includes a step of transmitting a pseudo noise coded spread spectrum reply signal.

24. A method as in claim 22 wherein the step of transmitting a pseudo noise coded spread spectrum signal includes steps of: transmitting a pseudo noise coded spread spectrum signal through a rotating beam antenna; and
inverting the pseudo noise code synchronously with the antenna beam rotations.

25. A method as in claim 23 wherein:
the step of transmitting a spread spectrum interrogation signal includes a step of transmitting a pseudo noise coded interrogation signal; and
the step of transmitting a pseudo noise coded spread spectrum reply signal includes a step of transmitting a pseudo noise code sequence related in time to a pseudo noise code sequence of the interrogation signal.

26. A method for determining relative range and bearing from an aircraft to landing site comprising steps of:
transmitting a PN coded spread spectrum interrogation signal from the aircraft;
receiving the PN coded spread spectrum interrogation signal at the landing site;
transmitting a PN coded spread spectrum beacon signal from the landing site to the aircraft such that:
(1) the duty cycle of the PN coded spread spectrum beacon signal has a duty cycle at least an order of magnitude greater than that of a conventional TACAN beacon signal;
(2) the amplitude of the beacon received at the aircraft varies as a function of relative bearing of the aircraft to the landing site; and
(3) the delay between the time of transmission of an identifiable portion of the PN code of the interrogation signal and the time of arrival of an identifiable portion of the PN code of the beacon signal varies as a function of relative range of the aircraft to the landing site.

27. A radio navigation system for determining the position of a mobile apparatus relative to a reference comprising:
position reference means for receiving an interrogation signal having spread spectrum signal characteristics and for transmitting a spread spectrum beacon signal, said spread spectrum beacon signal having a duty cycle at least an order of magnitude greater than that of a conventional TACAN beacon signal; and
mobile relative position determination means for transmitting a spread spectrum interrogation signal, for receiving the spread spectrum beacon signal and for determining position relative to the position reference means from the spread spectrum beacon signal.

28. A system as in claim 27 wherein a spread spectrum signal is a pseudo noise coded signal.

29. A system as in claim 28 wherein:
the reference means includes antenna means for transmitting the beacon with a rotating beam and means for inverting the PN code sequence of the beacon periodically and synchronously with the antenna rotations; and
the mobile relative position reference means includes means for determining bearing from the amplitude of the beacon and from the inversion times of the PN code sequence of the beacon.

30. A system as in claim 29 wherein:
the reference means includes means for transmitting a spread spectrum beacon signal having a PN code sequence related in time with a PN code sequence of a spread spectrum interrogation signal; and
the mobile relative position reference means includes means for determining the time delay between a transmitted spread spectrum interrogation signal code sequence and the received spread spectrum beacon PN code sequence.

31. A radio navigation system for determining relative bearing of a mobile apparatus relative to a reference comprising:
bearing reference means for transmitting a beacon signal having spread spectrum signal characteristics, said beacon signal having a duty cycle at least an order of magnitude greater than that of a conventional TACAN beacon signal; and
mobile relative bearing determination means for receiving the spread spectrum beacon signal and for determining relative bearing to the bearing reference means from the spread spectrum beacon signal.

32. A system as in claim 31 wherein a spread spectrum signal is a pseudo noise coded signal.

33. A system as in claim 32 wherein:
the reference means further includes antenna means for transmitting the beacon with a rotating beam and means for inverting the PN code sequence of the beacon periodically and synchronously with the antenna rotations; and
the mobile relative position reference means includes means for determining bearing from the amplitude of the beacon and from the inversion times of the PN code sequence of the beacon.

34. A radio navigation system comprising:
range reference means for receiving an interrogation signal having spread spectrum, characteristics and for transmitting a spread spectrum reply signal, said spread spectrum reply signal having a duty cycle at least an order of magnitude greater than that of a conventional TACAN beacon signal; and
mobile relative range determination means for transmitting a spread spectrum interrogantion signal, for receiving the spread spectrum reply signal and for determining range to the reference means from the spread spectrum reply signal.

35. A system as in claim 34 wherein a spread spectrum signal is a pseudo noise coded signal.

36. A system as in claim 35 wherein:
the reference means includes means for transmitting a spread spectrum reply signal having a PN code sequence related in time with a PN code sequence of a spread spectrum interrogation signal; and
the mobile relative range determination means includes means for determining the time delay between a transmitted spread spectrum interrogation signal PN code sequence and the received spread spectrum reply PN code sequence.

37. A system as in any of claims 27, 31 or 34 wherein the reference means moves relative to the earth's surface.

* * * * *